US007860269B2

United States Patent
Gal et al.

(10) Patent No.: US 7,860,269 B2
(45) Date of Patent: Dec. 28, 2010

(54) AUXILLIARY NAVIGATION SYSTEM FOR USE IN URBAN AREAS

(75) Inventors: Ehud Gal, Reut (IL); Yaron Greenhut, Haifa (IL)

(73) Assignee: O.D.F. Optronics Ltd., Tel Aviv (IL)

( * ) Notice: Subject to any disclaimer, the term of this patent is extended or adjusted under 35 U.S.C. 154(b) by 873 days.

(21) Appl. No.: 11/665,480

(22) PCT Filed: Oct. 16, 2005

(86) PCT No.: PCT/IL2005/001093

§ 371 (c)(1),
(2), (4) Date: Jun. 7, 2007

(87) PCT Pub. No.: WO2006/043270

PCT Pub. Date: Apr. 27, 2006

(65) Prior Publication Data

US 2007/0286459 A1    Dec. 13, 2007

(30) Foreign Application Priority Data

Oct. 18, 2004   (IL)   ..................................... 164650

(51) Int. Cl.
*G06K 9/00*   (2006.01)
*G01B 11/26*   (2006.01)
(52) U.S. Cl. ........................ 382/100; 382/190; 356/138
(58) Field of Classification Search ................ 382/100, 382/103, 106, 107, 155, 168, 181, 190, 199, 382/203, 232, 254, 260, 274, 276, 291, 305, 382/312; 702/150; 359/400, 138; 345/7, 345/421; 348/189; 356/138
See application file for complete search history.

(56) References Cited

U.S. PATENT DOCUMENTS

| 4,322,726 | A | * | 3/1982 | Collier et al. ................... 345/7 |
| 4,380,024 | A | * | 4/1983 | Olofsson ..................... 348/189 |
| 4,489,389 | A | * | 12/1984 | Beckwith et al. ............ 345/421 |
| 5,815,411 | A | * | 9/1998 | Ellenby et al. .............. 702/150 |
| 5,825,480 | A | * | 10/1998 | Udagawa ..................... 356/138 |
| 6,233,094 | B1 | * | 5/2001 | Tsuda ......................... 359/400 |

OTHER PUBLICATIONS

Farzin Mokhtarian et al., "A Theory of Multiscale, Curvature-Based Shape Representation for Planar Curves", IEEE Transactions on Pattern Analysis and Machine Intelligence, vol. 14, No. 8, Aug. 1992, pp. 789-805.

(Continued)

*Primary Examiner*—Seyed Azarian
(74) *Attorney, Agent, or Firm*—Frommer Lawrence & Haug LLP; William S. Frommer

(57) ABSTRACT

The invention is a method for the extraction, identification and comparison of skylines from imagery data specifically, for the purpose of accurately locating the position of a mobile platform for navigation purposes. The invention is carried out by processing images obtained using a compact mobile electro-optic device that is designed to be mounted on any mobile platform, such that a clear circumferential view of the surroundings is available. The method allows the position of the mobile platform to be determined in three dimensional space, relative to any arbitrary coordinate system; the exact map coordinates of the platform to be determined; or allows the platform to follow a previously traversed track.

17 Claims, 4 Drawing Sheets

OTHER PUBLICATIONS

Farzin Mokhtarian, "Silhouette-Based Isolated Object Recognition through Curvature Scale Space", IEEE Transactions on Pattern Analysis and Machine Intelligence, vol. 17, No. 5, May 1995, pp. 539-544.

Canny, John. "A Computational Approach to Edge Detection," IEEE Transactions on Pattern Analysis and Machine Intelligence, 1986. vol. PAMI-8, No. 6, pp. 679-698.

* cited by examiner

AUXILLIARY NAVIGATION SYSTEM FOR USE IN URBAN AREAS

FIELD OF THE INVENTION

The present invention relates to the field of imaging. Specifically, the invention is related to the field of computer vision. More specifically, the invention relates to methods for accurately locating the position of vehicles for navigation purposes.

BACKGROUND OF THE INVENTION

Today's modern armies make wide use of computer based systems. These armies rely on sophisticated systems to deliver to the forces in the front the latest and most reliable information. One of the key types of information needed is the accurate location of ground forces, especially in intricate and complicated situations such as urban warfare.

Urban warfare has become, in today's battlefields, more and more common. Many of the conflicts today involve war against local militia which operates from within local innocent population located in dense urban areas.

Fighting in an urban environment was never an easy task for any regular army. Regular armies depend on heavy armored vehicles and tanks for the deployment of soldiers and as main combating units. These vehicles usually have a navigation system based on GPS (Global Positioning System) that tends to give poor readings in dense urban surroundings. This creates situations in which the crew of the vehicle fails to locate itself accurately. Also the close proximity of neighboring friendly fighting units creates a major need for the knowledge of the accurate location of these units, in order to minimize cases of "friendly fire".

The increasing use and development of autonomous vehicles as part of the fighting units, and as auxiliary support units for human fighters has also created a situation where a need for a reliable navigation system in urban areas exists.

The method most commonly used today for the navigation of vehicles (autonomous, semi-autonomous, and human driven) is mainly based on the GPS. For the GPS system to work properly a clear line of sight with the sky is needed. In urban areas the skies are mostly obscure by surrounding buildings and the GPS system fails to deliver a reliable solution.

Navigation solutions presented in the prior art include a receptor, which is designed to present navigation data, and an external station, from where navigation data is obtained and/or cross-referenced. Proper operation of these solutions requires continuous and uninterrupted communication between the receptor and the external station. Such communication is not always possible due to physical blockage caused by buildings, etc; electronic warfare; and numerous additional reasons.

As of yet, no real solution to the problems discussed above has been suggested. A partial solution can be obtained by the use of aerial photos. It is important to mention that in cases as described above, the use of a map and compass is close to useless since most of the surroundings are obscured and it is very difficult to find one's location in the map. Also, when dealing with autonomous vehicles, such a solution is not suitable.

It is the purpose of the present invention to provide a sensor assembly capable of providing accurate navigation readings and which is designed especially for situations where prior art navigation systems fails to yield acceptable readings, either due to physical location limitation or electronic warfare such as communication blockage.

It is another purpose of the present invention to provide a sensor assembly to be used on autonomous land vehicle for independent navigation in urban areas.

It is yet another purpose of the present invention to provide a method for using a sensor assembly to follow a previously traversed path, when the information from the previous traversal is available.

It is further a purpose of the present invention to provide a simple visualization of the present location and other navigation information on a three dimensional model of the surroundings if such exists.

Further purposes and advantages of the invention will appear as the description proceeds.

SUMMARY OF THE INVENTION

The invention is a method for the extraction, identification and comparison of skylines from imagery data. The method is comprised of the following steps:
  a. providing an image sensor capable of acquiring an image of a circumferential field of view;
  b. providing a processing means capable of processing the image acquired by the image sensor;
  c. obtaining one or more images of the skyline with the image sensor and transferring the images to the processing means;
  d. providing an algorithm implemented by the processing means, the algorithm including the following steps:
   i. identification and extraction of a first set of one or more skylines from a first set of one or more circumferential images obtained by the image sensor;
   ii. modeling and representation of the skylines;
   iii. assigning coordinates to the skylines in the first set, wherein the coordinates represent the location from which each image was taken;
   iv. storing the first set of skylines together with the coordinates assigned to it in a database;
   v. identification and extraction of a second skyline from a second circumferential image obtained by the image sensor;
   vi. modeling and representation of the second skyline;
   vii. comparing the second modeled skyline to the skylines of the first set of modeled skylines stored in the database to find a match between the second skyline and at least one of the skylines from the first set of skylines stored in the database; and
   viii. assigning the coordinates assigned to the first skyline to the second skyline, after a match is found.

In a preferred embodiment of the invention identification and extraction of a first set of one or more skylines from a first set of one or more circumferential images obtained by the image sensor is accomplished by performing Canny edge detection, wherein the gradient image produced during the operator operation is enhanced using the gradient image histogram to increase the dynamic range of the gradient image. In this embodiment this step can also include performing an opening operator on the Canny edge detection operator's edge image. This method is also used for identification and extraction of the second skyline.

In the method of the invention, the first skylines and the second skyline are found by using a tracking operation along the sky edges found in the image. The modeling of the first skylines and the second skyline is performed by building a Curvature State Spaces graph and location and registration of prominent points in the graph.

The first skylines stored in the database and the second skyline, can be obtained by the same image sensor on two different occasions. In this case, the location of the image sensor when it obtained the image of the second skyline can be found based on the known location of the image sensor when it obtained the image of the first skyline.

Alternatively the first skylines stored in the database and the second skyline, can be obtained by two different circumferential image sensors, of essentially the same kind. In this case, the location of the image sensor which obtained the image of the second skyline can be found based on the known location of the image sensor which obtained the matching image of the first skyline. According to this embodiment of the method of the invention, a second mobile platform having an image sensor which obtains an image of the second skyline can follow a first mobile platform having an image sensor which obtains an image of the first skyline. The first mobile platform transmits skyline data to the second mobile platform. The second mobile platform performs image processing to find a match between the first skyline and the second skyline, and adjusts its travel route in order to obtain a match between the first skyline and the second skyline.

According to the invention the relative azimuth of the locations from which two different images were taken is calculated from at least two prominent points that recur in both of the skylines and are extracted from both of the images.

In order to carry out the method of the invention, the image sensor may comprise a 180° "Fish Eye" lens or any other lens being either reflective, refractive or both, covering a circumferential field of view.

In addition to the skyline, the method of the invention may rely upon: the extraction and identification of infrastructure and natural terrain outlines and any other special features in the image for the purpose of orientation and navigation; the extraction and identification of celestial bodies in the image together with information of date and time for the purpose of orientation and navigation; and the extraction and identification of road boundary lines if such exists in the image in order to calculate the vehicle position and orientation relative to the road

DETAILED DESCRIPTION OF THE INVENTION

Publications and other reference materials referred to herein, including reference cited therein, are incorporated herein by reference in their entirety and are numerically referenced in square brackets in the following text and respectively grouped in the appended Bibliography which immediately precedes the claims.

The method of the invention is carried out using a mobile electro-optic device that is designed to be mounted on any mobile platform, such that a clear view of the surroundings is available for the purpose of self-positioning and/or following a previously traversed track. The system is also suitable for allowing the estimation of the platform's orientation in three dimensional space relative to any arbitrary coordinates system. The system of the invention described herein comprises a circumferential imaging sensor assembly along with a processing unit, capable of extracting from the surroundings prominent, robust features that do not tend to vary over time, and the method of the invention utilizes this information for the purpose of self-positioning estimation. It is to be noted that in this application, when referring to the imaging sensor assembly, the terms the terms "circumferential" and "omni-directional" are used interchangeably to describe a lens or lens system capable of capturing the image of the surroundings as well as the skyline.

For a better understanding of the invention and to show how the same may be carried into effect, reference will now be made, purely by way of example, to the accompanying drawings. With specific reference to the drawings in detail, it is stressed that the particulars shown are by way of example and for purposes of illustrative discussion of preferred embodiments of the present invention only, and are presented for the purpose of providing what is believed to be the most useful and readily understood description of the principles and conceptual aspects of the invention. In this regard, no attempt is made to show structural details of the invention in more detail than is necessary for a fundamental understanding of the invention. From the description taken together with the drawings it will be apparent to those skilled in the art how the several forms of the invention may be embodied in practice.

Figure 1:
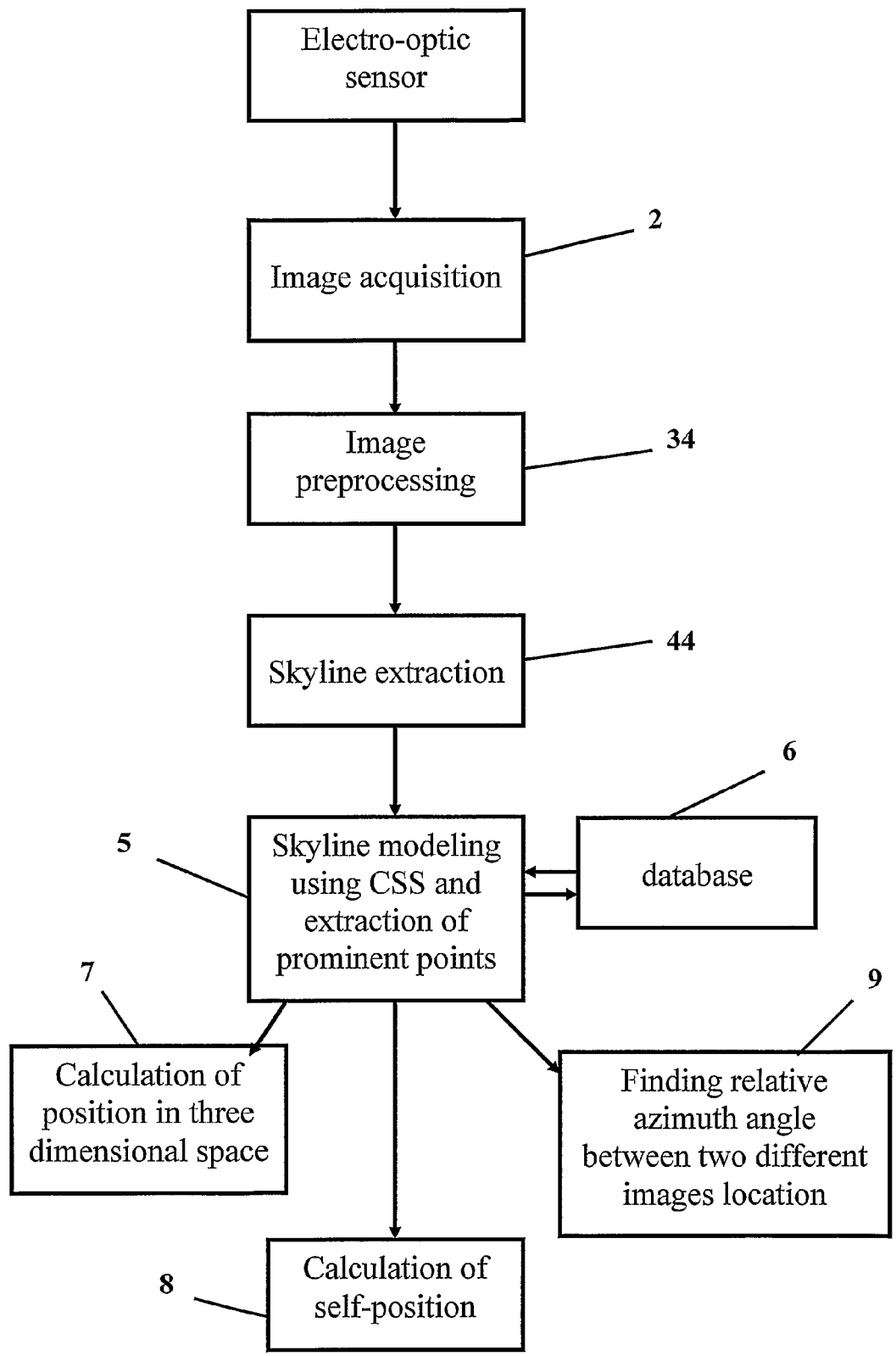
FIG. 1 is a general overview of the structure of the system and the method.

FIG. 1 is a block diagram showing a general overview of a preferred embodiment the invention. Starting from top to bottom:

(a) An electro-optic sensor (1) is used for imaging the scene surrounding the platform. The electro-optic sensor is comprised of at least an omni-directional lens (such as a "fish-eye" lens, or any other optical lens assembly capable of covering a circumferential field of view, which will include the skyline), and an imaging sensor (2) capable of acquiring the omni-directional scene transmitted from the lens;

(b) The image acquired by the imaging sensor (2) is transmitted to a processing unit, e.g. a computer station or a DSP component, for purposes of image processing (3). The image processing includes the following steps:

(i) A modified Canny edge detection [1] is preformed, where the gradient image produced during the operator operation is enhanced using the gradient image histogram to increase the dynamic range of the gradient image.

(ii) An "opening" operator on the Canny edge detection operator's edge image is then preformed.

(iii) The image is then processed to extract the skyline (4), i.e. the line which represents the collection of all tangent points of the urban environment shown in the image with the sky. The skyline is found using a simple tracking operation along the sky edges found in the preprocessed image.

(iv) The skyline is then modeled by building a CSS (Curvature State Spaces [2], [3]) graph (5) for it. During the graph building process, prominent points are located and registered.

The modeled skyline can then be saved [to be used as a database for later trips through the location of the same scene], or compared against existing modeled skylines, which were previously stored in the database (6), in order to:

determine the position, e.g. yaw, pitch, and roll, in three dimensional space (7) relative to any coordinate system; or calculate the exact coordinates of the platform, if the prominent points in the database have some coordinates attached to them (8); or find the relative azimuth between two images of the same location (9) wherein the two images may either be taken by the same platform at two different times, or may be two images taken by two different platforms. In both cases the two images are taken from the same location or from a close enough proximity so that they can be considered to have been taken from the same location.

In other embodiments other algorithms and image processing methods may be used to achieve the purpose of the invention. The use of the "Canny" algorithm and the "Opening" operator, as described herein, are an example of a preferred embodiment only, and should not be considered to be the only method to achieve the purpose of the invention. The selection of the algorithms that are to be implemented on the image is derived from the required navigation accuracy and from image features such as blurriness, brightness, "noise" etc. These features, depending on their influence on the image, may require implementation of additional image processing algorithms, which are not detailed herein. Typically the database will contain a large number of skylines obtained from corresponding circumferential images gathered as a data stream. Since the platform is traveling in a continuous and frequently extended trip, the individual images to be compared against those in the database will be selected from an essentially continuous data stream and processed as outlined herein.

It is stressed that the method of this invention is based upon the comparison of skylines; however, those skilled in the art may find it useful to compare additional features and characteristics between images. By additional features and characteristics are meant features and characteristics that add certainty to the comparison process, e.g. infrastructure shapes, such as those of bridges, roads, and building, and natural terrain outlines, provided that these do not tend to vary over time. Also celestial bodies in the image together with information of date and time can be used for the purpose of orientation and navigation. When adding comparison of these additional features to the skyline comparison, it may result in more accurate and truer results of image comparison.

From an application perspective, when implementing the method of the present invention for use with a mobile platform, the extraction of the skyline can be used for several scenarios:

In a first embodiment the processing unit on the mobile platform holds a database of a previously extracted skyline together with real-world coordinates attached to it. In this case the skyline captured by the imaging assembly is compared to the stored database, real-world coordinates are assigned accordingly from the database to the skyline captured by the imaging assembly, therefore the real-world position of the platform on which the system is installed can be determined.

In another embodiment, an imaging system of the present invention is installed on a first platform which is autonomous, semi-autonomous or human controlled. The system of the first platform travels along a path and collects imagery data of the skyline and transmits it to additional platforms that are also equipped with a system of the invention. The other platforms, which receive the skyline data from the first platform, use this data to compare to the skyline which they collect independently and make the necessary course adjustments to achieve full (or sufficient) overlap of the two skylines.

Both embodiments can be used regardless of whether the motions of the platforms along the route are separated from each other by small or large time intervals.

It is noted that the term "real world coordinates" as used herein, refers to any coordinate system which the user may see fit to use in order to assign coordinates to the skyline, which makes it possible to understand the location of the platform. Such coordinates may be created by a GPS (Global Positioning System); according to a map; or by any other means which supplies such coordinates.

Figure 2:
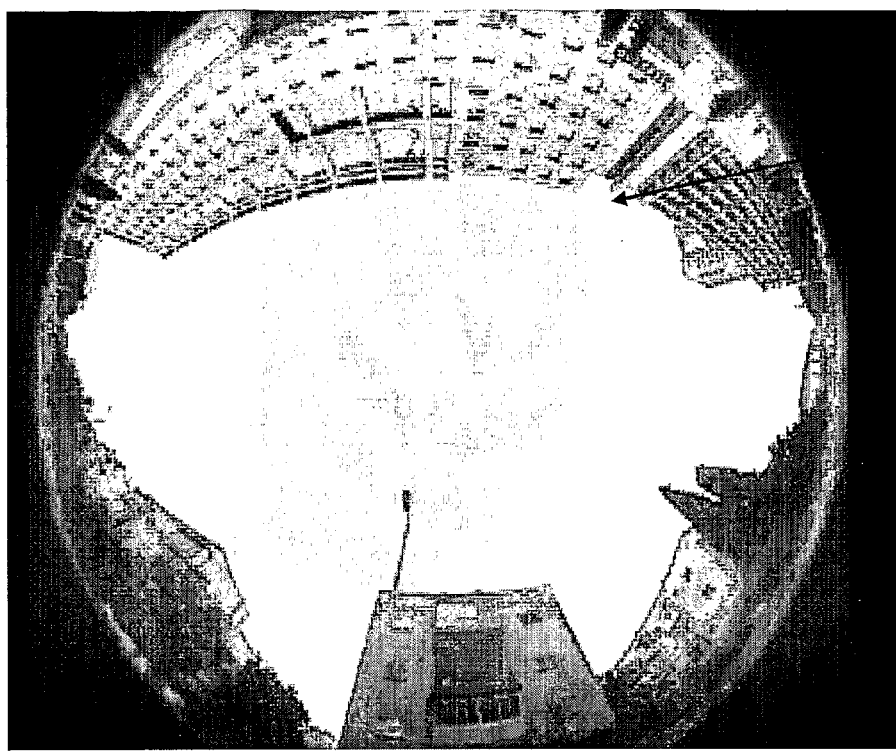
FIG. 2 is an example of a typical scene image of an urban area captured using circumferential image sensor.

FIG. 2 shows an example of a typical scene image captured using an omni-directional lens (11). The specific lens used for capturing this image is a Fish-Eye lens with a 180° field of view. The difference between the sky and the ground level structures, vegetation, etc. can be seen clearly in the image. Although the specific image shown in this figure was obtained by imaging using a Fish-Eye lens, it is also possible to obtain a full circumferential skyline using any available lens which provides a circumferential field of view, for example, lenses which are based on reflective qualities.

Figure 3:
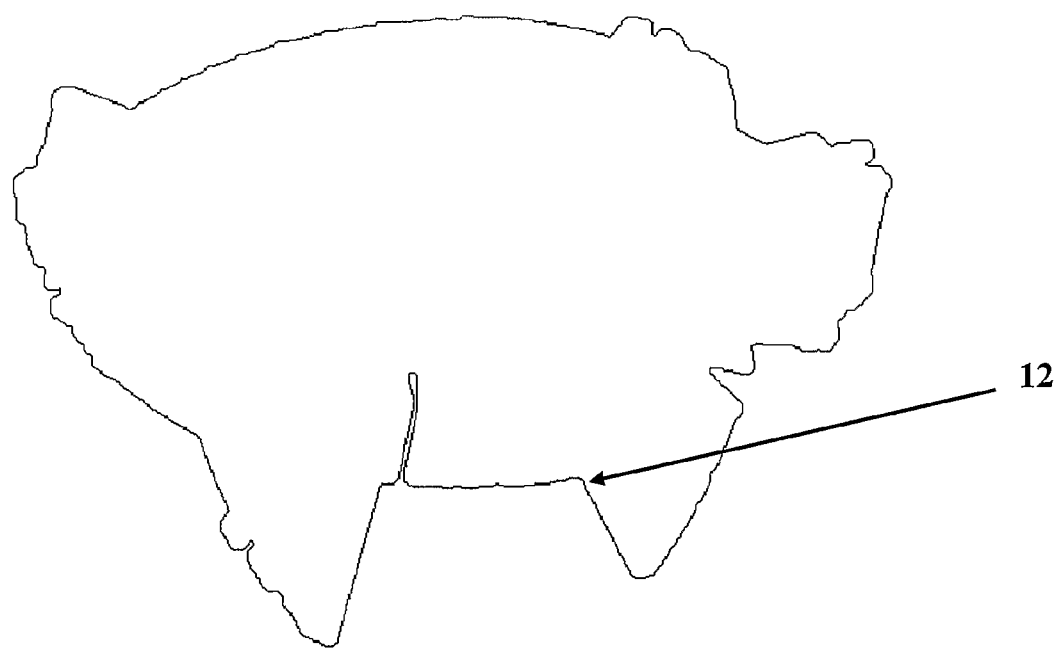
FIG. 3 is an image of the skyline extracted from the image in FIG. 2.

FIG. 3 is an image of the skyline (12) extracted from the image in FIG. 2 (11). It is easy to see that the line in FIG. 3 (12) complements precisely the skyline in the image in FIG. 2 (11). It is also easy to recognize the uniqueness of each point of the skyline which is viewed. Those skilled in the art would appreciate that for skyline comparison purposes, it is not necessarily required to store the entire image in the data base. In order to save storage space and to increase the efficiency of data retrieval it is possible just to store a compressed image of the skyline, or an array which represents the skyline according to an algorithm which maps the skyline to an array of numbers. It is further noted that the skyline may be represented in the database as a finite collection of prominent or unique points which comprise it, and it is not necessarily required to store the skyline in its entirety.

Figure 4:
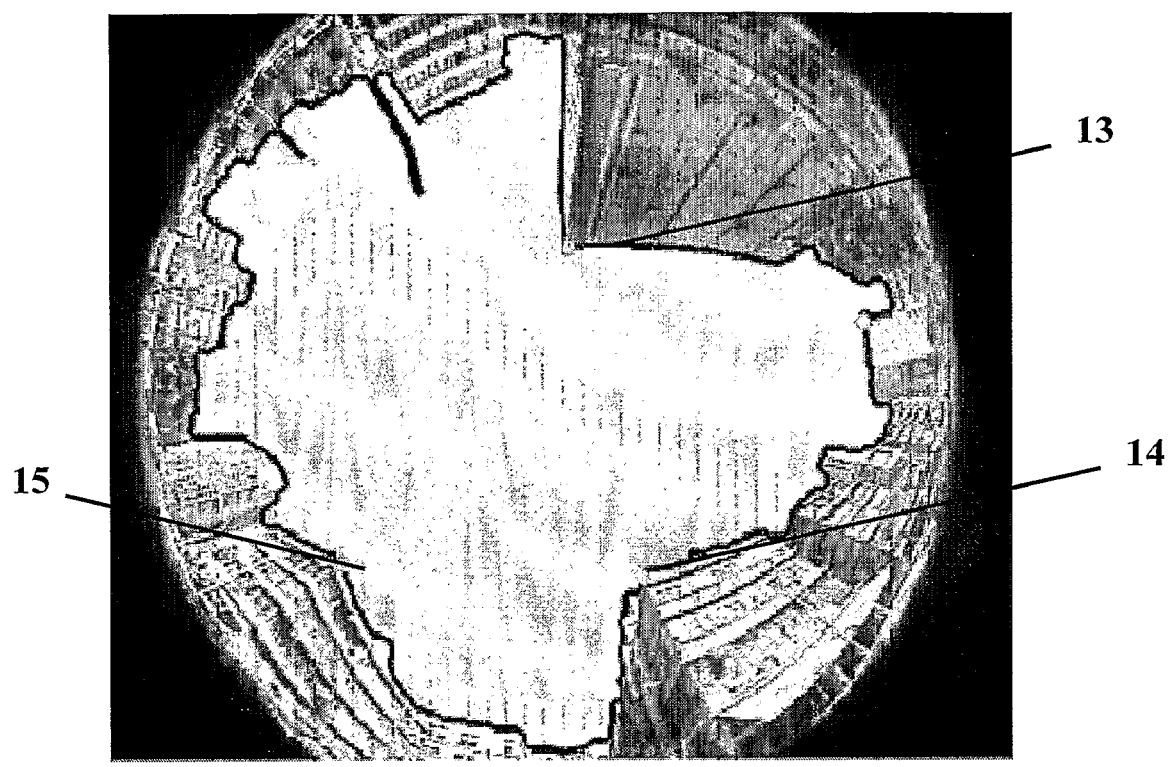
FIG. 4 is a typical circumferential image taken in an urban area using a circumferential image sensor, where the prominent points extracted are superimposed on the image.

FIG. 4 is a typical image obtained using an omni-directional lens. In this figure, the prominent points (13) (14) (15) extracted from the skyline are superimposed on the image. It is sufficient to know the coordinates of three such prominent points in order to calculate the self-position of the mobile platform (step (8) in FIG. 1). It is necessary to know the elevation and azimuth of only two points appearing in two different images of the same skyline in order to calculate the relative azimuth between the two images (step (9) in FIG. 1).

Figure 5:
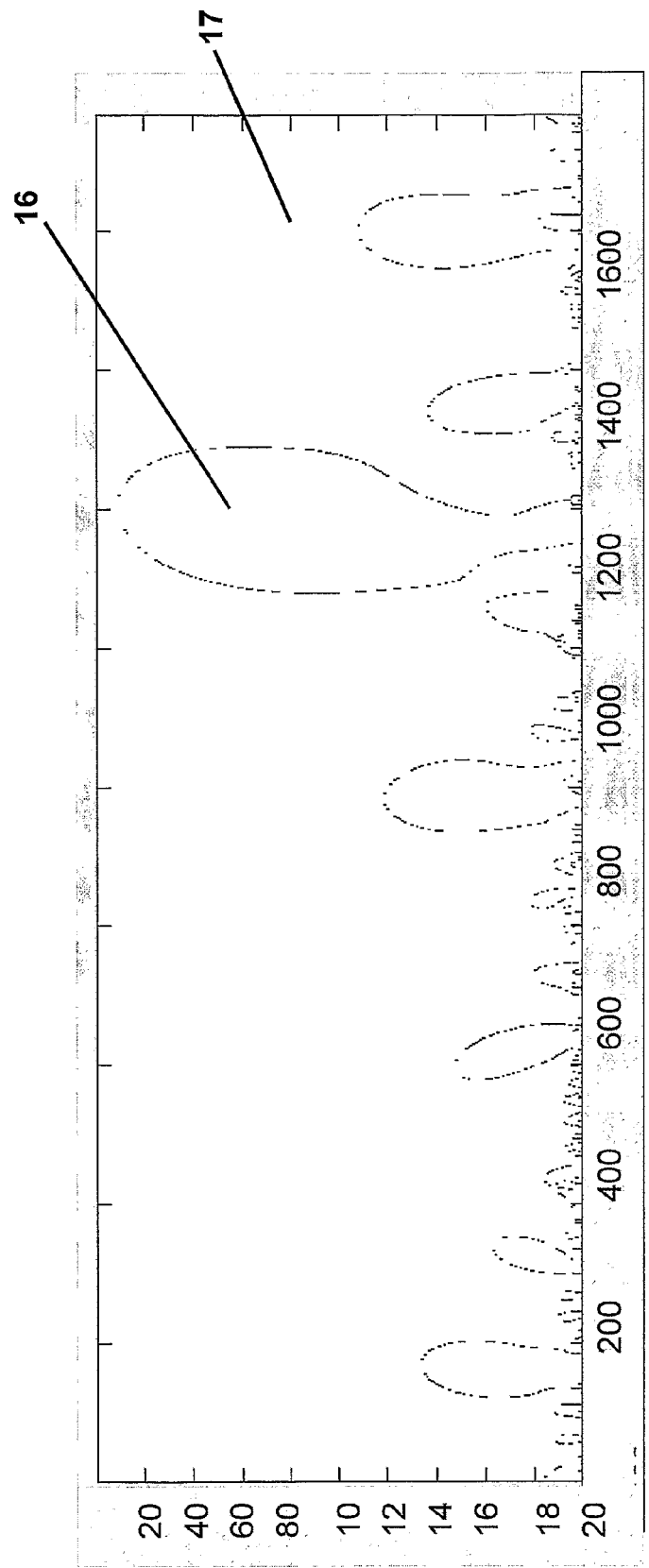
FIG. 5 is the CSS graph of the image from FIG. 2.

FIG. 5 is the CSS graph (17) of the image from FIG. 2. The graph is used to calculate the curvature of the skyline curve at each point using different smoothing filters. The larger the "blob" (16) in the graph, the more the skyline is curved at that area.

Although embodiments of the invention have been described by way of illustration, it will be understood that the invention may be carried out with many variations, modifications, and adaptations, without departing from its spirit or exceeding the scope of the claims.

BIBLIOGRAPHY

[1] Canny, John. "A Computational Approach to Edge Detection," IEEE Transactions on Pattern Analysis and Machine Intelligence, 1986. Vol. PAMI-8, No. 6, pp. 679-698.

[2] Farzin Mokhtarian and Alan K. Mackworth "A theory of multiscale, curvature-based shape representation for planar curves" IEEE transactions on pattern analysis and machine intelligence, vol. 14, no. 8, 1992.

[3] Frazin Mokhtarian "Silhouette-based isolated object recognition through curvature scale space", IEEE transactions on pattern analysis and machine intelligence, vol. 17, no. 5, 1995.

The invention claimed is:

1. A method for the extraction, identification and comparison of skylines from imagery data for the purpose of accurately locating the position of a mobile platform for navigation purposes, said method comprised of:
   a. providing an image sensor capable of acquiring an image of a circumferential field of view;
   b. providing a processing means capable of processing the image acquired by the image sensor;
   c. obtaining one or more images of said skyline with said image sensor and transferring said images to said processing means;
   d. providing an algorithm implemented by the processing means, said algorithm including the following steps:
      i. identification and extraction of a first set of one or more skylines from a first set of one or more circumferential images obtained by said image sensor;
      ii. modeling and representation of said skylines;
      iii. assigning coordinates to the skylines in said first set, wherein the coordinates represent the location from which each image was taken;
      iv. storing said first set of skylines together with the coordinates assigned to it in a database;
      v. identification and extraction of a second skyline from a second circumferential image obtained by said image sensor;
      vi. modeling and representation of said second skyline;
      vii. comparing said second modeled skyline to the skylines of said first set of modeled skylines stored in said database to find a match between said second skyline and at least one of said skylines from said first set of skylines stored in said database; and
      viii. assigning said coordinates assigned to said first skyline to said second skyline, after a match is found.

2. A method according to claim 1, wherein step i comprises performing Canny edge detection, wherein the gradient image produced during the operator operation is enhanced using the gradient image histogram to increase the dynamic range of the gradient image.

3. A method according to claim 2, wherein step i includes performing an opening operator on the Canny edge detection operator's edge image.

4. A method according to claim 1, wherein the first skylines and the second skyline are found by using a tracking operation along the sky edges found in the image.

5. A method according to claim 1, wherein modeling of the first skylines and the second skyline is performed by building a Curvature State Spaces graph and location and registration of prominent points in said graph.

6. A method according to claim 1, wherein the first skylines stored in the database and the second skyline, are obtained by the same image sensor on two different occasions.

7. A method according to claim 6, wherein the location of the image sensor when it obtained the image of the second skyline is found based on the known location of the image sensor when it obtained the matching image of the first skyline.

8. A method according to claim 1, wherein the first skylines stored in the database and the second skyline are obtained by two different circumferential image sensors, of essentially the same kind.

9. A method according to claim 8, wherein the location of the image sensor which obtained the image of the second skyline is found based on the known location of the image sensor which obtained the matching image of the first skyline.

10. A method according to claim 8, wherein a second mobile platform having an image sensor which obtains an image of the second skyline follows a first mobile platform having an image sensor which obtains an image of the first skyline, the first mobile platform transmits skyline data to the second mobile platform, said second mobile platform performs image processing to find a match between said first skyline and said second skyline, and said second mobile platform adjusts its travel route in order to obtain a match between said first skyline and said second skyline.

11. A method according to claim 1, wherein the relative azimuth of the locations from which two different images were taken is calculated from at least two prominent points that recur in both of said skylines and are extracted from both of said images.

12. A method according to claim 1, wherein the image sensor comprises a 180° "Fish Eye" lens.

13. A method according to claim 1, wherein the image sensor comprises a reflective lens covering a circumferential field of view.

14. A method according to claim 1, wherein the image sensor comprises a refractive lens covering a circumferential field of view.

15. A method according to claim 1, comprising the extraction and identification of infrastructure and natural terrain outlines and any other special features in the image for the purpose of orientation and navigation.

16. A method according to claim 1, comprising the extraction and identification of celestial bodies in the image together with information of date and time for the purpose of orientation and navigation.

17. A method according to claim 1, comprising the extraction and identification of road boundary lines if such exists in the image in order to calculate the vehicle position and orientation relative to said road.

* * * * *